UNITED STATES PATENT OFFICE.

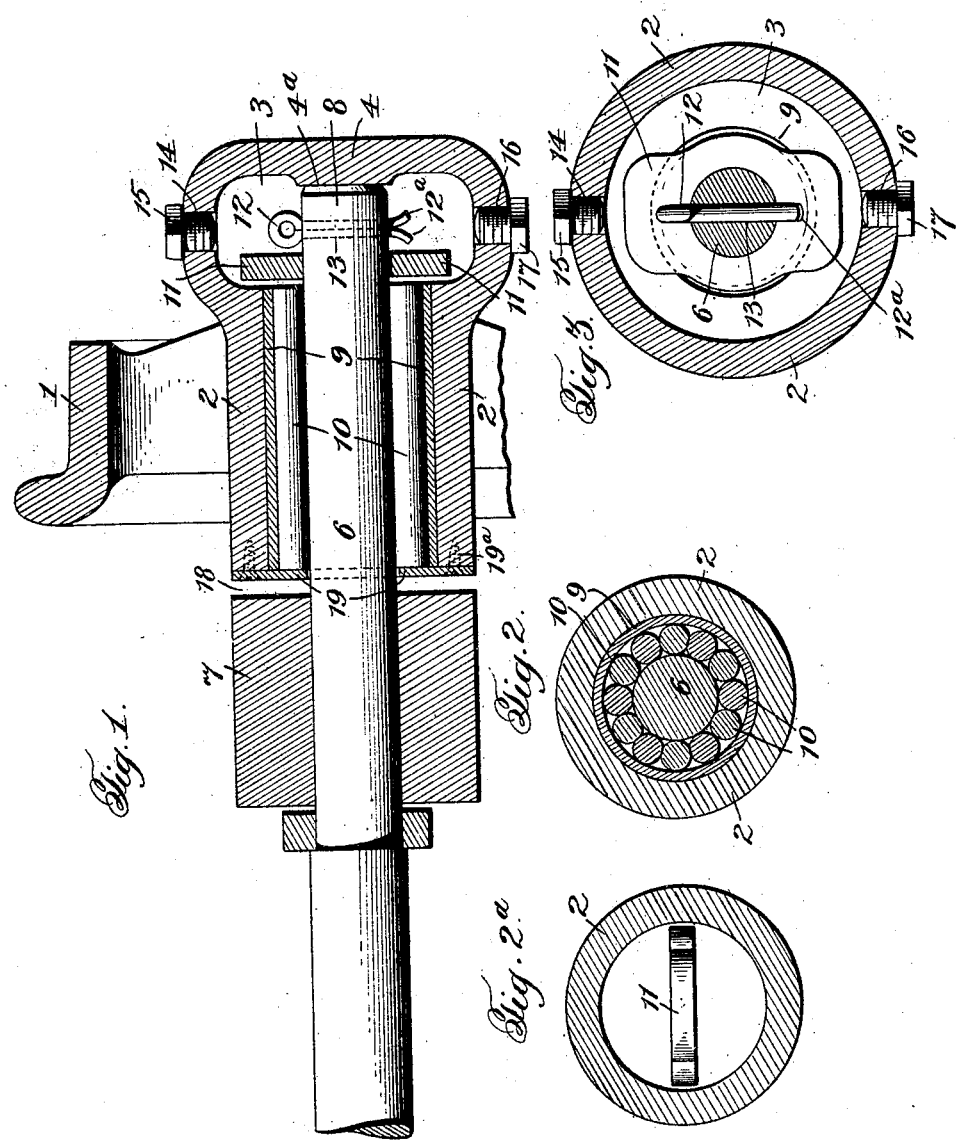

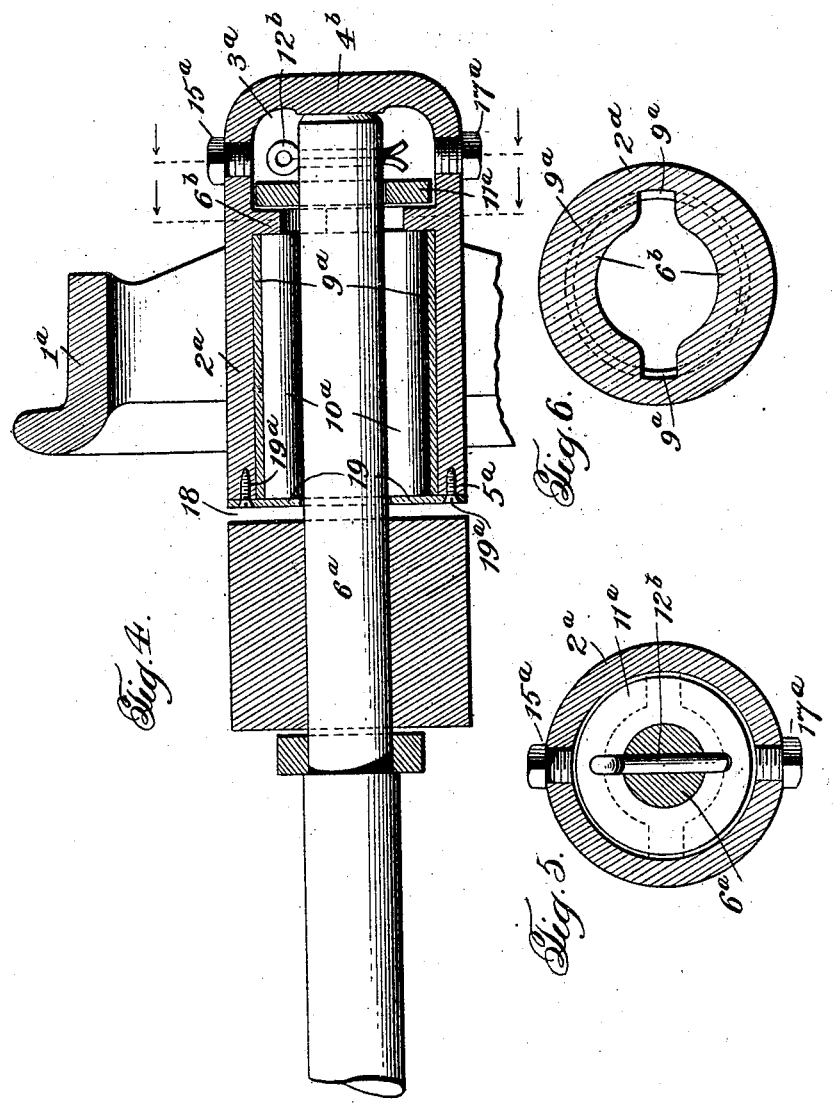

HUGH W. SANFORD, OF KNOXVILLE, TENNESSEE.

HUB.

1,085,302.  Specification of Letters Patent.  Patented Jan. 27, 1914.

Application filed August 14, 1913. Serial No. 784,799.

*To all whom it may concern:*

Be it known that I, HUGH W. SANFORD, a citizen of the United States, residing at Knoxville, in the county of Knox and State of Tennessee, have invented certain new and useful Improvements in Hubs, of which the following is a specification, reference being had therein to the accompanying drawing.

This invention relates to car wheels, and while not limited to such use, the wheels of the invention are primarily designed for mining car service. In constructions of this character, it is customary to provide a wheel hub having an inner chamber adapted for the reception of the end of an axle, the wheel being rotatable relative to the axle, and the hub chamber being designed to contain a suitable lubricant.

Various means have been devised for supporting the hub of wheels of this character upon the axle, a commonly used construction being to provide a loose collar upon the axle adjacent its end to engage a projection of the hub and limit movement of the axle in one direction, the reverse movement of the axle being limited by a suitable abutment on the hub cap, which latter is removable whereby to gain access to the interior of the hub and to permit of the removal of the washer. This construction has proven unsatisfactory to a large extent because of the incident leakage of oil at the joints and the caps oftentimes become broken, loose and lost. These objections have led to the suggestion of a solid hub construction, that is one having an integral cap and a longitudinal bore, a retaining collar on the axle being employed as before but it was necessary to set the collar into the core employed in casting the hub. While this construction proved satisfactory to an extent, at the same time it was open to the objection, among others, that the washer was permanently positioned in the hub chamber, and could not be removed or replaced, should the washer become broken or damaged or worn out.

The present invention is designed to overcome the above and other objections incident to wheels of the character above described, and other wheels as at present in general use, and may be said to reside in a novel construction and arrangement of parts coöperating to produce a simple, inexpensive, durable and highly efficient wheel, and one in which novel supporting means for the axle is provided, the same permitting ready removal and replacing of parts as occasion demands.

More particularly, the invention includes a hollow hub member having an integral closed outer end, an axle loosely mounted in the hollow hub, the closed end of the hub forming an abutment for the end of the axle, and an apertured collar being provided for the axle within the hub adapted to engage a wall of the hub to limit the movement of the axle in an opposite direction, the collar and hub end opening being designed and arranged whereby the collar may be removed by an edgewise movement through the opening upon the removal of the axle.

Other improvements and novel details in the construction and arrangement of parts will be more particularly referred to hereinafter, in the description, which, for a clear understanding thereof, should be read in connection with the accompanying drawings, forming a part hereof, and wherein is disclosed for the purpose of illustration, convenient and satisfactory embodiments of the invention.

In the drawings: Figure 1 is a longitudinal section of a wheel and hub with an axle applied thereto: Figs. 2, 2ª and 3 are detail sectional views: Fig. 4 is a longitudinal section of a modified form of construction, and Figs. 5 and 6 are detail views of sections of the modified form of construction, removed.

With more particular reference to the drawings, wherein like reference numerals refer to corresponding parts throughout the several views, 1 represents the tread of a wheel, and 2, a hub, the hub being hollow to form an interior chamber 3, and having an integral closed outer end 4, the inner end being open for the reception of the axle. An axle 6 projects through a suitable pedestal 7 and the end 8 thereof projects through the open end of the hub into the chamber 3. The end of the axle 8 is preferably cylindrical in cross section, and the periphery thereof is smooth and continuous throughout. A suitable steel lining 9 overlies the inner periphery of the inner wall opening of the hub, and interposed between said lining and axle are a series of roller bearings 10.

From the construction thus far described, it will be observed that the hub and wheel are adapted to rotate relative to the axle, and the axle may be readily inserted and removed through the inner wall opening. The closed end 4 of the hub is conveniently enlarged, as at $4^a$, whereby it constitutes an abutment for the end of the axle 8. Movement of the axle in an opposite direction is limited by a washer 11 of a size to overlie the wall of the opening at the inner side of the hub. The washer 11 is preferably disk-shaped and has a central aperture whereby it may be sleeved upon the axle. The washer is held in place as by a suitable cotter-pin 12 passing through a transverse aperture 13 in the axle. The cotter-pin is removable from the axle and also from the hub, through a suitable opening 14, which said opening is normally closed through the medium of a threaded bolt 15. The hub is also preferably provided with an opening 16 adapted to receive a threaded bolt 17, and in this connection, it will be observed that the pin may be inserted through one of said openings and through the transverse opening 13 of the axle, and the pin arms $12^a$ separated by inserting a suitable tool through the opposite opening of the hub.

It is very desirable to provide a construction in which the washer may be removed or replaced as occasion demands, not only from the axle, but from the hub itself, and at the same time, it is desirable to accomplish this result without resorting to removable caps and the like at the outer end of the hub, since this portion of the hub constitutes an oil receptacle, as is obvious. In order to provide for this removable characteristic of the washer, in the form of construction illustrated in Figs. 1 to 3 of the drawings, it will be observed that the washer, as illustrated in said Figs. 1 to 3, is substantially elliptical in outline, and the inlet opening at the inner side of the hub substantially cylindrical.

The greatest diameter of the washer is greater than that of the cylindrical opening, to the end that when the washer is in position on the axle, the same cannot be removed through the hub opening. When, however, it is desired to remove the washer, the cotter-pin is removed from the axle, the axle withdrawn from the hub, and the washer turned edgewise and removed through said opening, the shortest diameter of the washer being less than that of the opening. In applying the washer, the same is passed through the open side, when in edgewise position, and assumes a position in the enlarged chamber 3 of the hub. The axle is then inserted through the hub opening, the washer sleeved upon the end thereof, and the cotter-pin positioned on the axle. When in this position, the inner surface of the collar constitutes a smooth bearing, engaging the wall of the hub, in the rotary movement of the wheel, the wheel and the cotter-pin coacting to hold the washer in normal position, and the enlarged portion $4^a$ of the closed end of the hub forming a bearing for the end of the axle, as is obvious.

In the modified construction illustrated in Figs. 4 to 6, the hub $2^a$ for the wheel $1^a$ (broken away) is closed at its rear end $4^b$, and open at its front end or inner side $5^a$, the hub being hollow to form a chamber $3^a$. In this construction the chamber $3^a$ may be substantially the same size as the opening $5^a$, an annular flange $6^b$ being interposed between the ends of the inner wall of the hub. The flange $6^b$ forms an abutment for one end of the steel lining $9^a$ and roller bearings $10^a$. The roller bearings are adapted to constitute an anti-friction support for the axle $6^b$, which latter projects at its end to a point adjacent the enlarged portion of the rear end of the hub $4^b$, which said enlarged portion constitutes an abutment. The hub is provided with threaded plugs $15^a$ and $17^a$ for assembling the cotter-pin $12^b$ through an aperture in the axle, in the manner previously described, when referring to the other form of my construction.

In the present illustrative embodiment of my invention, the washer, preferably formed of a steel disk, takes a circular form, and is given the numeral $11^a$. On the other hand, the opening formed by the flange $6^b$ is substantially elliptical, as illustrated in Fig. 6, to the end that the washer when in position on the shaft and held in place by the cotter pin $12^b$, is adapted to engage behind the rear wall of the flange $6^a$ and form a smooth bearing, the flange or shoulder $6^a$ coöperating with the pin $12^b$ to prevent withdrawal of the axle from the hub. When it is desired to remove the washer $11^b$, the cotter pin is removed from the axle, and the axle removed from the hub when the washer, by being turned to an edgewise position, may be withdrawn through the opening formed by the flange $6^a$ of the inner wall of the hub. The diameter of the circular disk-shaped washer $11^b$ is greater than the smaller diameter of the opening formed by the shoulder $6^b$, and smaller than the greater diameter of said opening.

In both the illustrative embodiments of my invention, it will be appreciated that while the axle is effectively locked in position by the washer, the hub and wheel may be also removed from the hub and axle, and the washer may be also removed from the hub and axle, and this without interfering with the oil tight characteristic of the hub. In both illustrations, the washer is removed or inserted by positioning the same edgewise, and bringing the smallest diameter of the washer into registration with the relatively enlarged diameter of the opening in the hub.

It is desirable to prevent rubbing contact of the wheel parts with the pedestal, and with this in view, in both of the illustrated embodiments of my invention I preferably provide a clearance space 18 between the pedestal and wheel hub and removably position on the end of the hub a retaining washer 19, secured as by screws 19ᵃ. The washer is of a size to overlie the end of the roller bearings 10ᵃ, whereby contact of the latter with the pedestal is avoided. When the washer is employed as just described, it will of course be necessary to first detach the same by removing the retaining screws, before withdrawing the washer 11 or 11ᵃ as the case may be, from the axle.

What I claim is:—

1. In a device of the character described, the combination of a hollow hub open at one end, an axle insertible through said opening, a disk-shaped washer of rigid construction loosely positioned in the hollow hub, and having an aperture to receive the axle, the said washer and end opening being so proportioned that the washer may be inserted and removed through the opening when in edgewise position only.

2. In a device of the character described, the combination of a hollow hub open at one end, an axle insertible through said end opening, a disk-shaped washer loosely positioned in the hollow hub, and having an aperture to receive the axle, the greatest diameter of the end opening being greater than one diameter of the washer, and the washer having a maximum diameter greater than one diameter of said opening, whereby the wall of the hub surrounding said opening forms a side bearing for the washer when the latter is in normal position on the axle, and whereby said washer may be removed from the hub opening edgewise.

3. In a wheel construction, a hub having a closed outer end, an interior chamber, and a connecting inner end opening, a rotatable shaft having an end projecting through said end opening into the hub chamber, a washer positioned in said chamber, and provided with an aperture to receive the shaft, means for limiting the outward sliding movement of the washer on the shaft, and a part of the hub limiting the inward movement of the washer, one of the parts comprising the washer, and the hub end opening being substantially elliptical, and the other of said parts substantially circular, whereby the washer may be inserted and removed through said opening.

4. In a wheel construction, the combination of a wheel having a hollow hub with a closed outer end and an open inner end, and a shoulder part on the inner surface of the hollow wall of the hub intermediate the ends thereof, an axle loosely positioned in the chamber formed by the hollow wall of the hub, roller bearings interposed between the axle and hub, an opening in the wall of the hub to the rear of said shoulder, a removable closure for said opening, a removable fastener on the axle in substantial alinement with said closed opening, a detachable disk shaped washer loosely sleeved on the axle at a point between said fastening means, and said shoulder, the said washer being of a size to overlie the opening in the side of the hub and removable through said opening.

5. In a car wheel, the combination of a wheel having an elongated hollow hub forming an interior chamber, the hub having an integral closed outer end, an open inner end, and an interior annular shoulder intermediate its ends, the said shoulder having oppositely cut out or reduced portions, an axle loosely passing through the open end of the hub to a point adjacent the closed rear end, a washer loosely sleeved on the axle at a point between the shoulder and closed rear end, a releasable retaining member coöperating with said shoulder to maintain the washer in place, and said washer comprising a substantially circular disk of a size to readily pass through the opening formed by said reduced portions of said shoulder when removed from the axle, and of a size to abut the greater portion of the shoulder when in position on the axle.

In testimony whereof I affix my signature in presence of two witnesses.

HUGH W. SANFORD.

Witnesses:
J. ANTRO FLEBBY,
J. S. GREEN.